US010444717B2

(12) United States Patent
Gary, Jr. et al.

(10) Patent No.: US 10,444,717 B2
(45) Date of Patent: Oct. 15, 2019

(54) COORDINATION OF CONTROL MODES AMONG APPLIANCES AND UTILITIES

(71) Applicant: WHIRLPOOL CORPORATION, Benton Harbor, MI (US)

(72) Inventors: Wyndham F. Gary, Jr., St. Joseph, MI (US); Neomar Giacomini, St. Joseph, MI (US); Richard J. Hughes, St. Joseph, MI (US); Michael J. Jakeway, Bridgeman, MI (US); Christopher W. Kelson, St. Joseph, MI (US); Saket Singh, Stevensville, MI (US); Andrew Benedict Artis, Orlando, FL (US)

(73) Assignee: Whirlpool Corporation, Benton Harbor, MI (US)

( * ) Notice: Subject to any disclaimer, the term of this patent is extended or adjusted under 35 U.S.C. 154(b) by 146 days.

(21) Appl. No.: 15/443,237

(22) Filed: Feb. 27, 2017

(65) Prior Publication Data

US 2018/0081331 A1 Mar. 22, 2018

Related U.S. Application Data

(60) Provisional application No. 62/395,607, filed on Sep. 16, 2016.

(51) Int. Cl.
| | | |
|---|---|---|
| G01M 1/38 | (2006.01) | |
| G05B 13/00 | (2006.01) | |
| G05B 15/00 | (2006.01) | |
| G05D 23/00 | (2006.01) | |
| G05B 15/02 | (2006.01) | |
| H04L 12/28 | (2006.01) | |

(52) U.S. Cl.
CPC .......... *G05B 15/02* (2013.01); *H04L 12/2803* (2013.01); *H04L 12/2816* (2013.01)

(58) Field of Classification Search
CPC ...................................................... G05B 12/02
USPC ............................................................ 700/275
See application file for complete search history.

(56) References Cited

U.S. PATENT DOCUMENTS

| | | |
|---|---|---|
| 6,400,956 B1 | 6/2002 | Richton |
| 6,539,570 B2 | 4/2003 | Youn et al. |

(Continued)

FOREIGN PATENT DOCUMENTS

| | | |
|---|---|---|
| EP | 2278421 A2 | 1/2011 |
| EP | 2518635 A1 | 10/2012 |

(Continued)

*Primary Examiner* — Md Azad
(74) *Attorney, Agent, or Firm* — Price Heneveld LLP (57) ABSTRACT

A system for controlling a plurality of appliances is disclosed. The appliances comprise a plurality of controllers in communication with a mobile device. Each of the controllers is configured to receive an instruction from the mobile device corresponding to a selected mode of a plurality of modes and apply the selected mode among the plurality of appliances as a selected global setting of a plurality of available global settings. The controller is further operable to activate an appliance specific control routine for each of the plurality of appliances based on the selected global setting and control each appliance based on the appliance specific control routine. The appliance specific control routine comprises a plurality of controls configured control an operation of each of the appliances causing the operation to conform to the selected mode.

12 Claims, 7 Drawing Sheets

(56) References Cited

U.S. PATENT DOCUMENTS

| | | |
|---|---|---|
| 6,919,790 B2 | 7/2005 | Kanazawa |
| 7,123,128 B2 | 10/2006 | Mullet et al. |
| 7,142,128 B2 | 11/2006 | Kobayashi |
| 7,190,266 B2 | 3/2007 | Mullet et al. |
| 7,206,559 B2 | 4/2007 | Meade, II |
| 7,469,550 B2 | 12/2008 | Chapman, Jr. et al. |
| 7,754,025 B1 * | 7/2010 | Crisp, III ............. B67D 1/0057 134/56 D |
| 7,957,697 B2 | 6/2011 | Park et al. |
| 8,086,757 B2 | 12/2011 | Chang |
| 8,190,275 B2 | 5/2012 | Chang |
| 8,412,382 B2 | 4/2013 | Imes et al. |
| 8,473,600 B2 * | 6/2013 | Hyvarinen .......... H04L 12/2827 709/203 |
| 8,577,392 B1 | 11/2013 | Pai et al. |
| 8,588,990 B2 | 11/2013 | Caceres et al. |
| 8,798,804 B2 | 8/2014 | Besore et al. |
| 8,868,218 B2 | 10/2014 | Park et al. |
| 8,930,037 B2 | 1/2015 | Brian et al. |
| 9,014,826 B2 | 4/2015 | Yum et al. |
| 9,203,695 B2 | 12/2015 | Rezvani et al. |
| 9,270,115 B2 | 2/2016 | Bosen et al. |
| 2004/0003079 A1 | 1/2004 | Aiu et al. |
| 2005/0035854 A1 | 2/2005 | Gupta et al. |
| 2008/0130520 A1 * | 6/2008 | Ebrom ...................... G06F 9/54 370/254 |
| 2008/0271123 A1 | 10/2008 | Ollis et al. |
| 2010/0127854 A1 | 5/2010 | Helvick et al. |
| 2010/0286801 A1 * | 11/2010 | Yum ................... H04L 12/2809 700/90 |
| 2011/0032423 A1 * | 2/2011 | Jing ...................... H04L 12/282 348/552 |
| 2012/0109395 A1 * | 5/2012 | Finch .................... G06Q 50/06 700/295 |
| 2012/0172027 A1 | 7/2012 | Partheesh et al. |
| 2013/0103222 A1 * | 4/2013 | Watson ................. G06Q 50/06 700/295 |
| 2013/0151012 A1 * | 6/2013 | Shetty ............... G05D 23/1923 700/276 |
| 2013/0314226 A1 | 11/2013 | Zhang |
| 2014/0167929 A1 | 6/2014 | Shim et al. |
| 2015/0087278 A1 | 3/2015 | Kim et al. |
| 2015/0177969 A1 | 6/2015 | Stoufer |
| 2015/0192915 A1 | 7/2015 | Seo et al. |
| 2015/0195100 A1 | 7/2015 | Imes et al. |
| 2016/0316293 A1 * | 10/2016 | Klimanis ............ H04L 12/2823 |
| 2017/0146969 A1 * | 5/2017 | Yamada ................... G06F 13/00 |

FOREIGN PATENT DOCUMENTS

| | | |
|---|---|---|
| EP | 2975590 A1 | 1/2016 |
| KR | 20030041690 A | 5/2003 |
| KR | 101074998 B1 | 10/2011 |
| WO | 2011139230 A2 | 11/2011 |
| WO | 2013106923 A1 | 7/2013 |

* cited by examiner

COORDINATION OF CONTROL MODES AMONG APPLIANCES AND UTILITIES

CROSS-REFERENCE TO RELATED APPLICATION

This application claims priority to U.S. Provisional Application No. 62/395,607, filed on Sep. 16, 2016, entitled "APPLIANCES," the disclosure of which is hereby incorporated herein by reference in its entirety.

BACKGROUND

There is an unmet need for appliances that help users to perform complex cooking tasks, enhance cooking experiences, enhance the food and beverage preparation experiences, minimize waste, and minimize energy consumption.

SUMMARY

In one aspect, a system for controlling a plurality of appliances is disclosed. The appliances comprise a plurality of controllers in communication with a mobile device. Each of the controllers is configured to receive an instruction from the mobile device corresponding to a selected mode of a plurality of modes and apply the selected mode among the plurality of appliances as a selected global setting of a plurality of available global settings. The controller is further operable to activate an appliance specific control routine for each of the plurality of appliances based on the selected global setting and control each appliance based on the appliance specific control routine. The appliance specific control routine comprises a plurality of controls configured control an operation of each of the appliances causing the operation to conform to the selected mode.

In another aspect, a method for controlling a plurality of appliances to apply a global setting for operation is disclosed. The method comprises receiving an instruction from a mobile device corresponding to a selected mode of a plurality of modes. The selected mode is applied among the plurality of appliances as a selected global setting of a plurality of available global settings. The method continues by activating an appliance specific control routine for each of the plurality of appliances based on the selected global setting and controlling each appliance based on the appliance specific control routine. The appliance specific control routine comprises a plurality of controls configured control an operation of each of the appliances causing the operation to conform to the selected mode.

In yet another aspect, a system for controlling a plurality of appliances is disclosed. The appliances comprise a plurality of controllers in communication with a mobile device. Each of the controllers is configured to receive an instruction from the mobile device corresponding to a selected mode of a plurality of modes and apply the selected mode among the plurality of appliances as a selected global setting of a plurality of available global settings. The controller is further operable to activate an appliance specific control routine for each of the plurality of appliances based on the selected global setting and control each appliance based on the appliance specific control routine wherein the selected mode corresponds to an away mode. The appliance specific control routine comprises a plurality of controls configured to control an operation of each of the appliances causing the operation to conform to the away mode.

DESCRIPTION

It is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Figure 1:
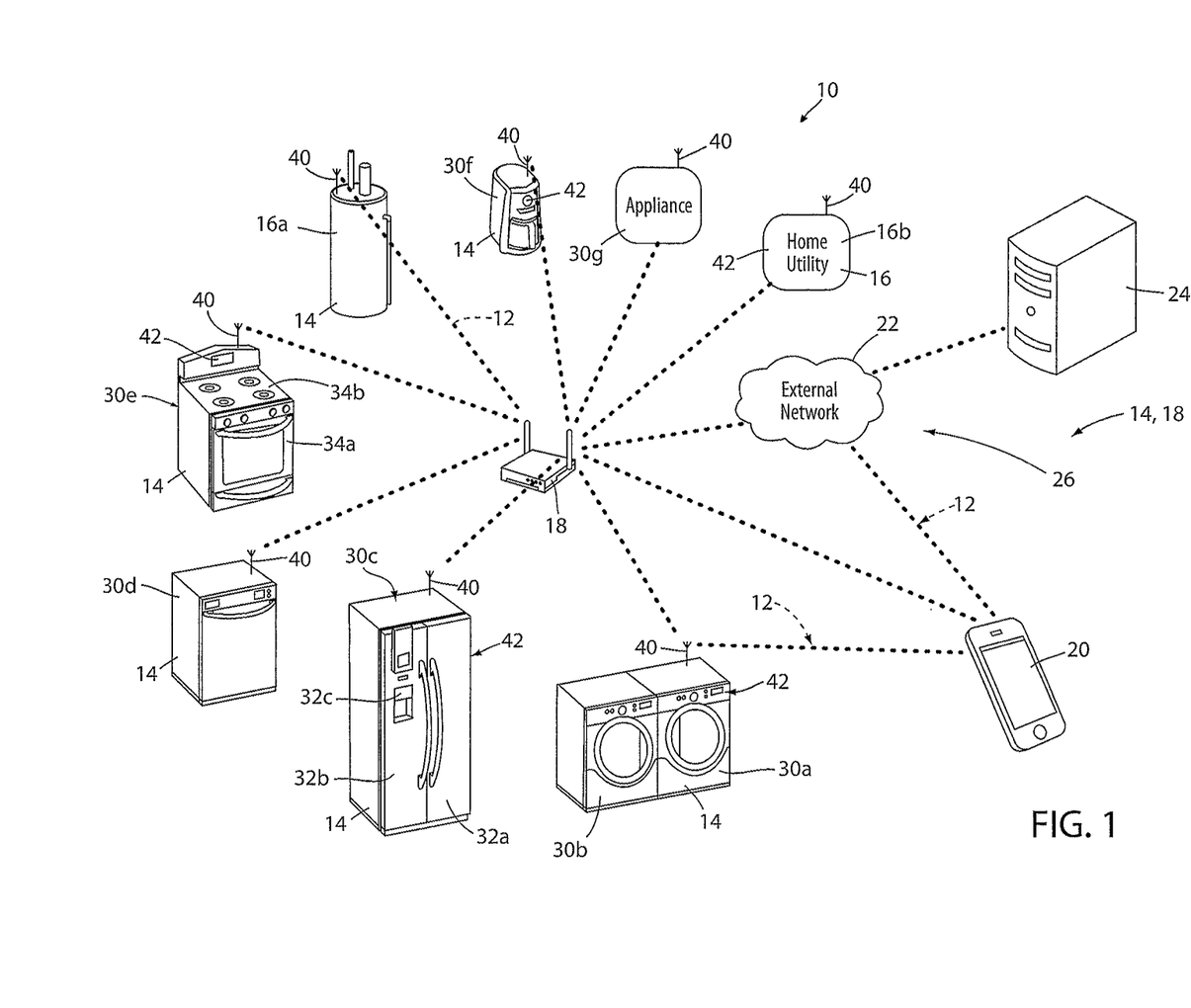
FIG. 1 is block diagram demonstrating an appliance and home utility control system.

Referring to FIG. 1, a schematic representation of a local network 10 demonstrating a communication interface 12 among a plurality of appliances 14 and home utilities 16 is shown. The communication interface 12 among the plurality of appliances 14 may be provided by a network switch or wireless router 18. The communication interface 12 may correspond to a variety of communication protocols configured to distribute data among various electronic devices. For example, the communication interface 12 may comprise an IEEE 802.11 connection, and IEEE 802.15 connection, a Bluetooth® connection, a Wi-Fi connection, a WiMAX connection, cellular signal, a signal using Shared Wireless Access Protocol-Cord Access (SWAP-CA) protocol, or any other type of RF or wireless signal. An IEEE 802.15 connection includes any wireless personal area networks (WPAN), such as ZigBee, Z-Wave, Bluetooth, UWB, and IrDA. In this configuration, the communication interface 12 may provide for the appliances 14 and utilities 16 to share and receive information to achieve one or more global settings.

In some embodiments, the communication interface 12 may further be configured to communicate with a mobile device 20. The mobile device 20 may be in communication directly with the wireless router 18, directly with one or more of the appliances 14 or the utilities 16, and may be operable to communicate with the wireless router 18 via a broadband or wireless network. Hereinafter the broadband or wireless network may be described as an external network 22, which may correspond to a cloud based network system or network with internet connectivity. Via the external network 22, the mobile device 20 may further be in communication with one or more external servers 24. Accordingly, the disclosure may provide for a remotely activated home control system 26 commonly referred to as a smart home system.

The appliances 14 and utilities 16 in communication with the communication interface 12 may vary based on the specific application of the home control system 26. Accordingly, the plurality of appliances 14 and utilities 16 discussed herein are provided as exemplary devices rather than an exhausted list of applications for the system 26. For example, the plurality of appliances 14 may comprise a clothes washer 30a, a clothes dryer 30b, a refrigeration unit 30c, a dishwasher 30d, a free standing range 30e, a coffee maker 30f, and various other appliances 30g.

The refrigeration unit 30c may correspond to various forms of refrigeration appliances and related accessories. For example, the refrigeration unit 30c may comprise a fresh food compartment 32a, a freezer 32b, and/or an ice maker 32c. Additionally, the refrigeration unit 30c may further comprise additional accessories including, but not limited to, an audio system, video system, personal computer, etc. Such additional accessories may also be incorporated into other examples of the plurality of appliances 14 as may be known in the art.

Though described as the free standing range 30e, the range 30e may correspond to a variety of cooking devices. For example, the range 30e may correspond to an oven 34a, a stove or cooktop 34b, a microwave, a toaster oven, or various other cooking devices. Accordingly, the home control system 26 may be configured to control a variety of mode settings for global operation among the plurality of appliances 14. Though not specifically shown in FIG. 1, the additional appliances 30g as previously described may correspond to a vent hood, robotic or automated vacuum, hot plate, or various other appliances.

The home control system 26 may also be configured to communicate and control a mode setting for global operation of one or more home utilities 16. For example, the communication interface 12 may provide for communication from the mobile device 20 to a water heater 16a and various additional home utilities 16b. The additional home utilities 16b may correspond to a water pump, heating and cooling (HVAC) system, and/or various other home utilities. In this configuration, each of the plurality of appliances 14 and home utilities 16 may be remotely controlled via the communication interface 12 with the mobile device 20 or other devices, which may be in communication with the external network 22.

Each of the plurality of appliances 14 and home utilities 16 may comprise one or more transceiver circuits 40. The transceiver circuits 40 may provide for one or more appliance controllers 42 of the appliances 14 and utilities 16 to receive instructions via the communication interface 12. For example, one or more appliance controllers 42 of the plurality of appliances 14 may receive an instruction from the mobile device 20. The instruction may comprise a selected mode of a plurality of modes of operation. In response to receiving the instruction, the one or more appliance controllers 42 may apply the selected mode as a global setting among the plurality of appliances 14.

The selected mode that is applied as the global setting among the plurality of appliances 14 may correspond to different appliance specific control routines for each of the plurality of appliances 14. Accordingly, the one or more appliance controllers 42 may be configured to access one or more routines to activate an appliance specific control routine based on the global setting for each of the plurality of appliances 14. In doing so, the appliance controller 42 may control at least one appliance to control at least one appliance specific function. The at least one appliance specific function controls a specific appliance of the plurality of appliances 14 to conform operation to the selected mode of the plurality of modes. In this way, the home control system 26 may provide for a mode setting to be applied to the plurality of appliances for global operation. Further details regarding the mobile device 20 and the appliance controller 42 are further discussed in reference to FIG. 7.

For example, in some embodiments, each of the appliance controllers 42 may comprise a memory configured to store various processing steps, algorithms, or routines to control an appliance specific control routine. The memory may be configured during a manufacturing operation of each of the appliances 14. In this way, each of the controllers 42 may be configured to control a specific appliance to conform to a global setting applied to all of the appliances 14 of the home control system 26. The appliance control routine may comprise various steps associated with each of the modes and/or themes discussed herein. Accordingly, the appliance controller 42 may be configured to control each of the appliances 14 and utilities 16 to apply various appliance specific function controls based on the appliance control routine and corresponding modes stored in the memory. Further discussion of the appliance controller 42 is provided in reference to FIG. 7.

Figure 2:
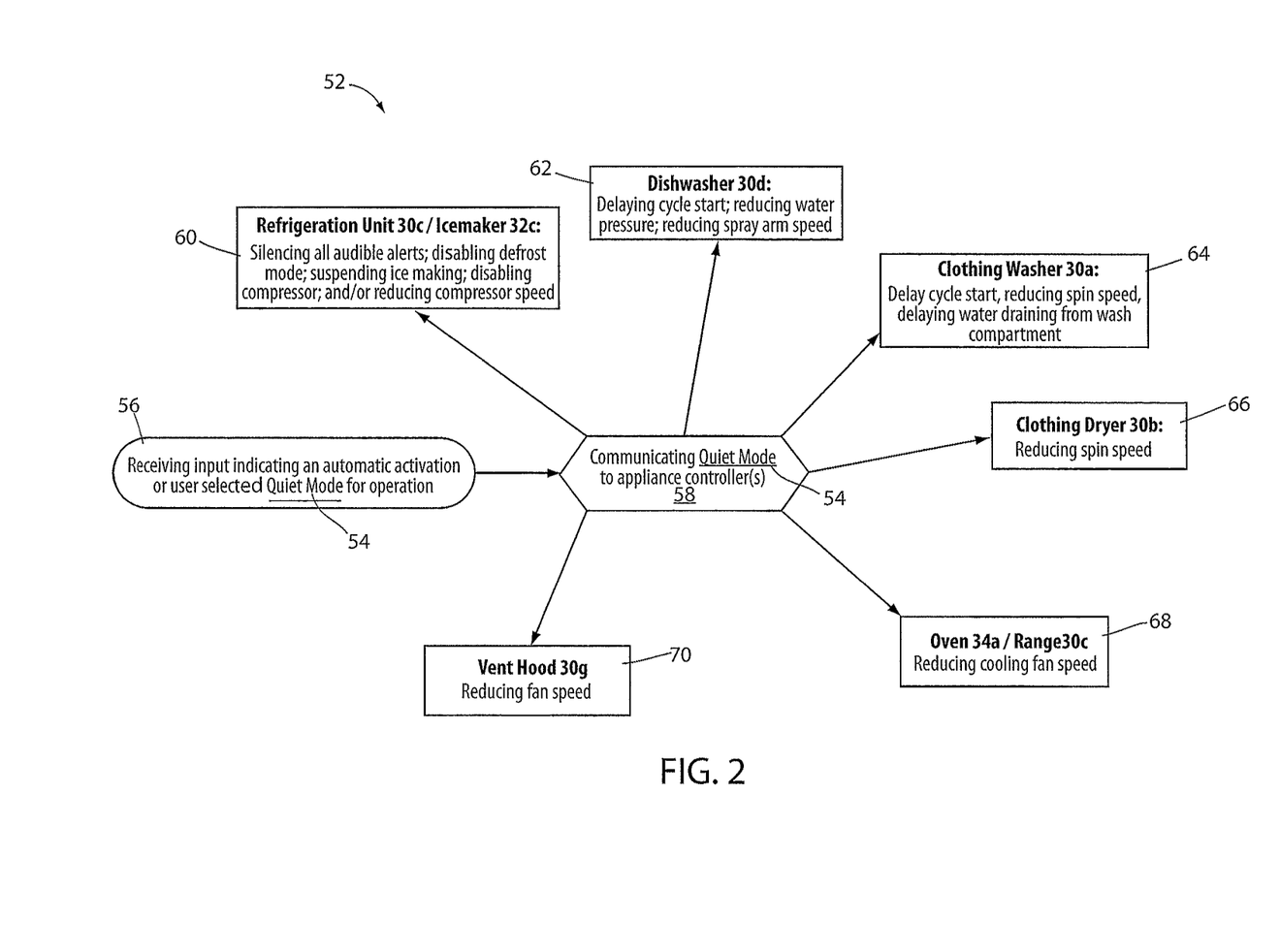
FIG. 2 is a flow chart demonstrating a quiet mode setting for global operation among a plurality of appliances.

The home control system 26 may provide for numerous control variations defining a plurality of mode settings for global operation among the plurality of appliances 14. Specific examples of such modes are now discussed in reference to FIGS. 2-5. Referring first to FIG. 2, a flow chart is shown demonstrating a method 52 for activating a quiet mode 54 for the plurality of appliances 14 and home utilities 16. In step 56, the method 52 may begin by receiving an input on the mobile device 20 indicating an automatic activation or a user selection of the quiet mode 54 for operation. In response to receiving the input, the mobile device 20 may communicate the quiet mode 54 to the one or more appliance controllers 42 (58).

In response to receiving the quiet mode 54 as the global setting for operation, the one or more appliance controllers 42 may apply an appliance specific control routine for each of the appliances 14 based on the quiet mode 54. For example, in step 60, the appliance controller 42 may control the refrigeration unit 30c and/or ice maker 32c to apply the following appliance specific function controls: silencing all audible alerts, disabling a defrost mode, suspending ice making, disabling a compressor, and/or reducing a compressor speed. In step 62, the one or more appliance controllers 42 may control the dishwasher 30d to apply the following appliance specific function controls: delaying a start cycle, reducing water pressure, and/or reducing spray arm speed. In step 64, the one or more appliance controllers 42 may control the clothing washer 30a to apply the following controls: delaying a cycle start, reducing a spin speed, and/or delaying water draining from a wash compartment. In response to receiving the quiet mode 54, the one or more appliance controllers 42 may further control the clothing dryer 30b to apply a function control including reducing a spin speed in step 66.

Additionally, in response to receiving the instruction for the quiet mode 54, the one or more appliance controllers 42 may control the oven 34a or range 30e by reducing a cooling fan speed in step 68. In response to receiving the quiet mode 54, the one or more appliance controllers 42 may control the vent hood 30g by reducing a fan speed as well in step 70. The examples provided in reference to the quiet mode 54 for the specific appliances of the plurality of appliances 14 may correspond to various operations or appliance specific function controls configured to limit an operating volume of the plurality of appliances 14. In order to enable or activate the appliance specific controls, the one or more appliance controllers 42 in communication with each of the appliances 14 may access the appliance specific controls from a memory. In this way, upon receiving a global mode setting (e.g. the quiet mode 54) for operation of the control system 26, the appliance controllers 42 may identify and control the appliances 14 to conform to the global setting by enabling the appliance specific control routines for the global setting.

Figure 3:
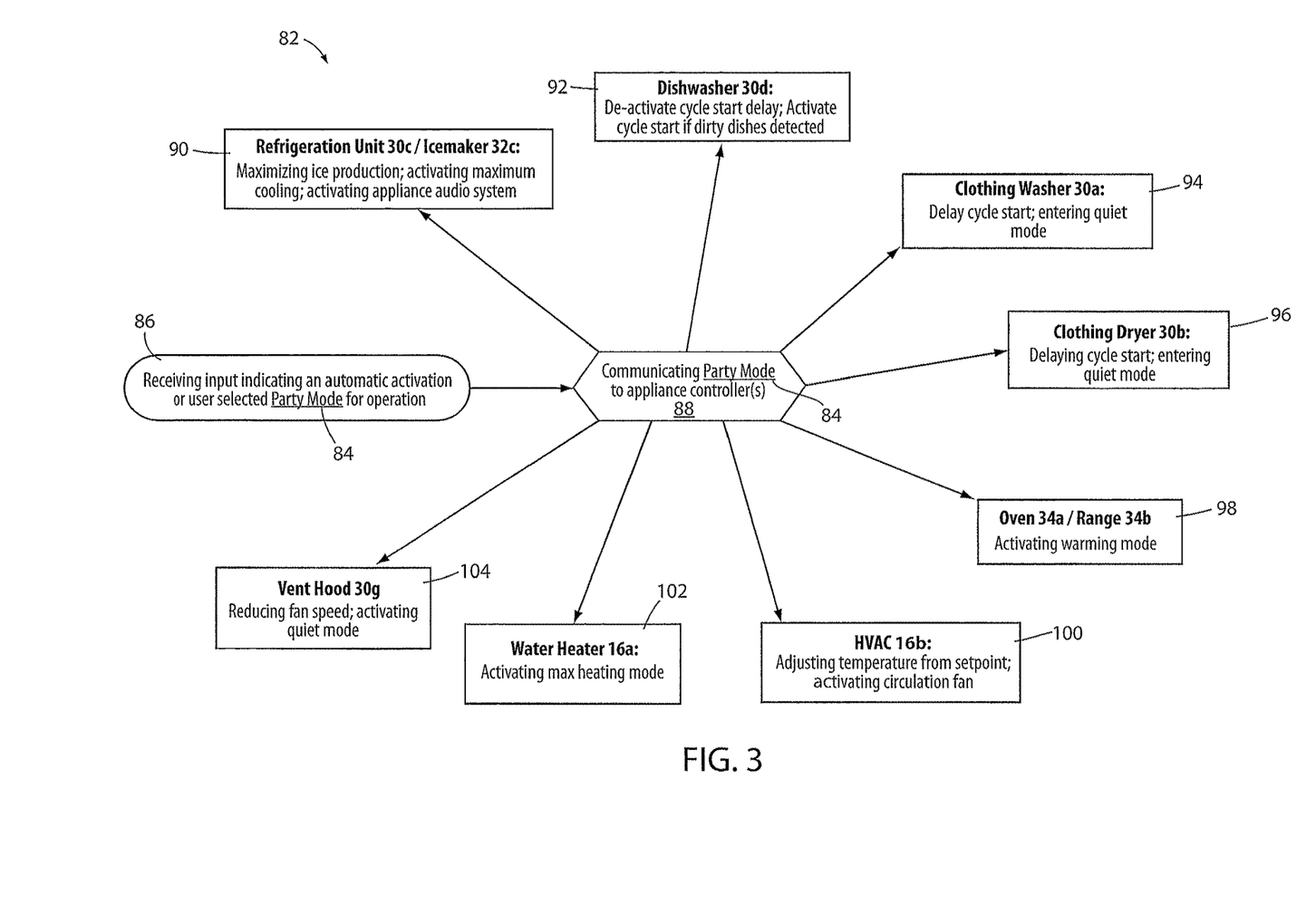
FIG. 3 is a flow chart demonstrating a party mode setting for global operation among a plurality of appliances.
Figure 4:
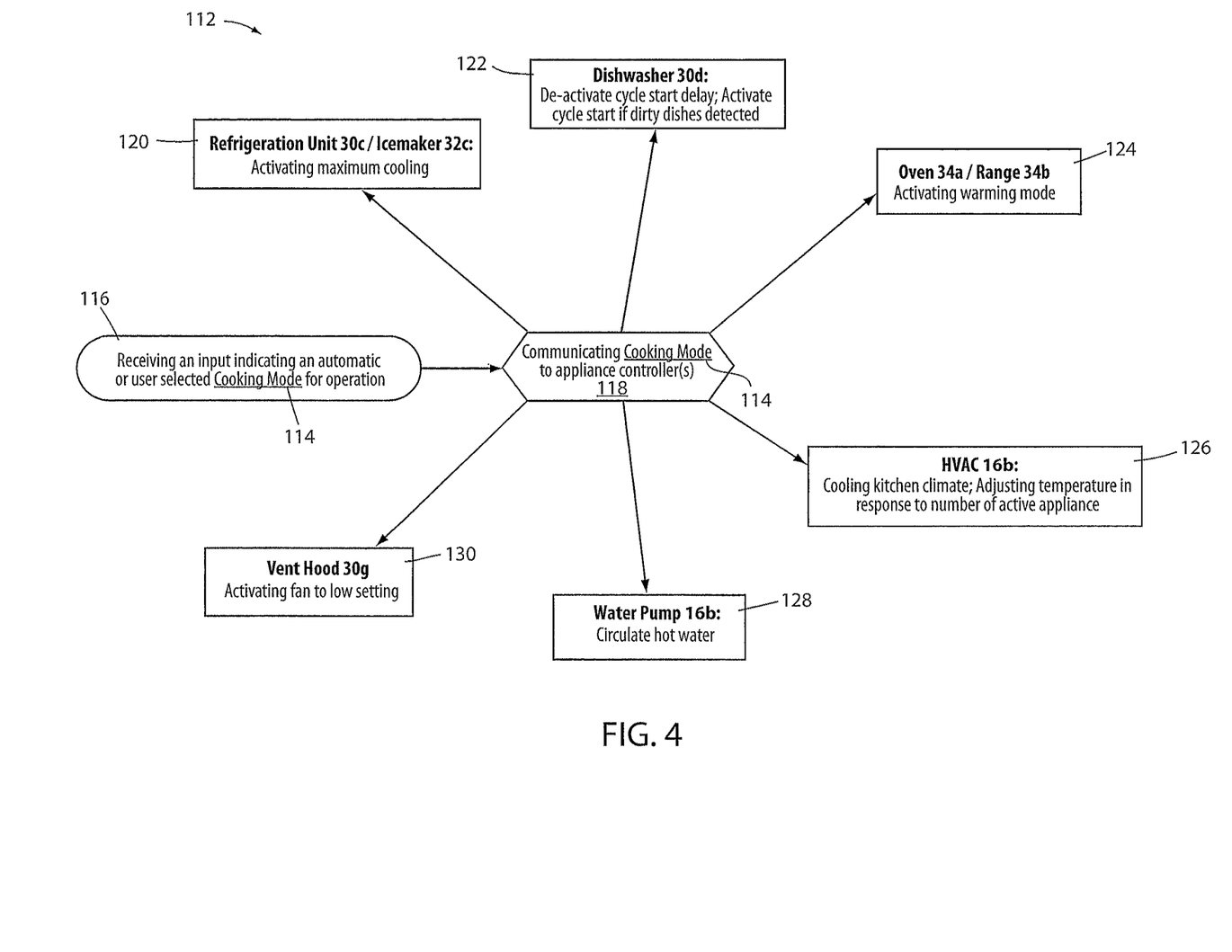
FIG. 4 is a flow chart demonstrating a cooking mode setting for global operation among a plurality of appliances.
Figure 5:
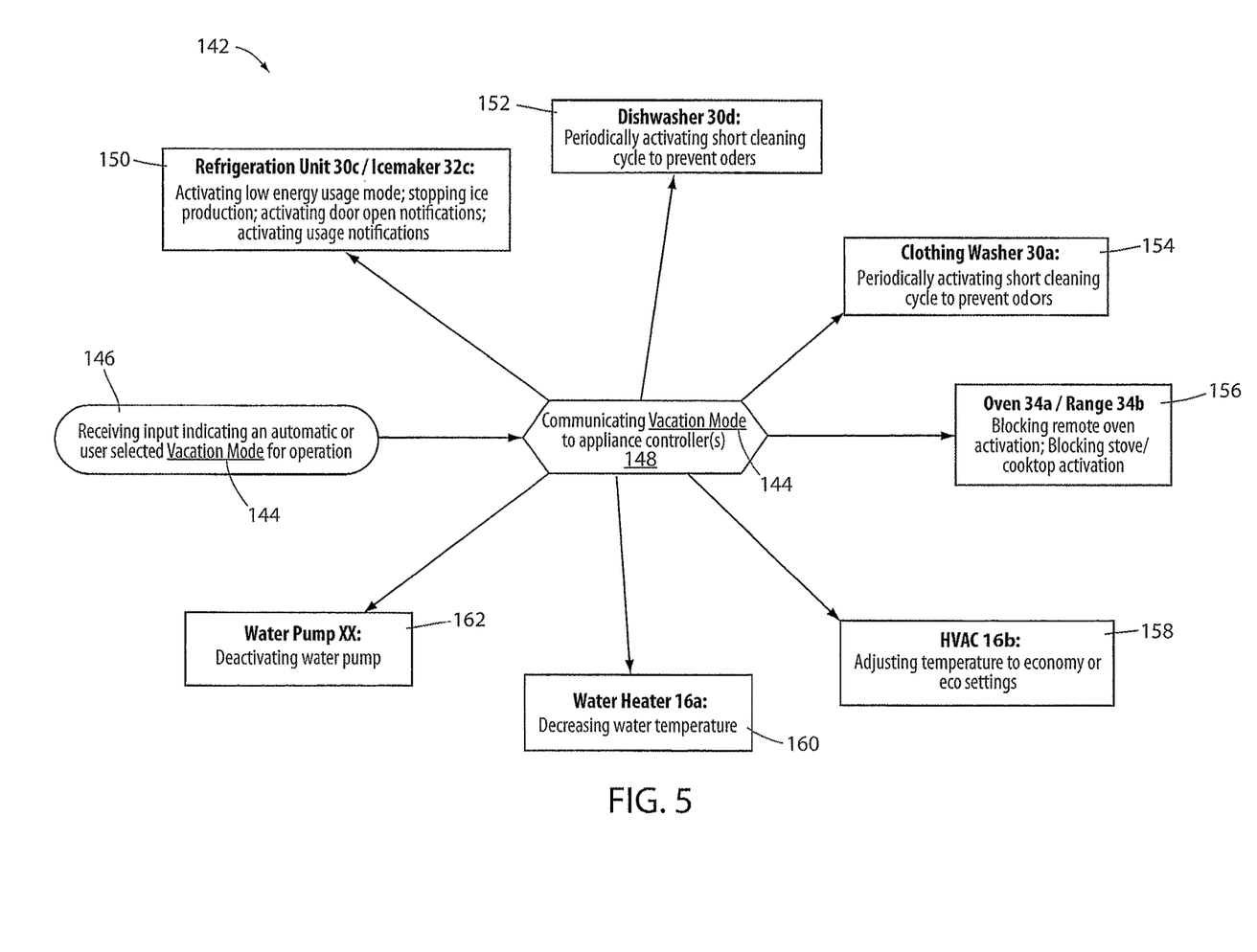
FIG. 5 is a flow chart demonstrating a vacation mode setting for global operation among a plurality of appliances.

The continuing description in reference to FIGS. 3, 4, and 5 includes additional examples of mode settings for global operation among the plurality of appliances 14 and/or home utilities 16. Such mode settings may be applied by the one more appliance controllers 42 in response to an input from a mobile device 20 via the communication interface 12. In each of the examples, the appliance controller 42 may apply appliance specific function controls for each of the appliances 14 and/or home utilities 16 as discussed in reference to FIG. 2. As such, the following descriptions provide for a variety of global settings and appliance specific controls that may be applied in various combinations to suit a desired mode of operation.

Referring now to FIG. 3, a method 82 for applying a party mode 84 for global operation among the plurality of appliances 14 and utilities 16 is demonstrated. The method 82 may begin by receiving an input on a mobile device 20 indicating an automatic activation or user selected identification of the party mode 84 (86). In response to the input received in step 86, the mobile device 20 may communicate the party mode to the one or more appliance controllers 42 (88). The instruction to activate the party mode 84 may be received by the appliance controller(s) 42 via the communication interface 12.

In response to the instruction from the communication interface 12, the one or more appliance controllers 42 may activate the party mode 84 for the plurality of appliances 14 and home utilities 16. In order to apply the party mode 84 as a global setting to the plurality of appliances 14 and home utilities 16, the one or more appliance controllers 42 may control the individual appliances and utilities with appliance specific function controls. The appliance specific function controls for the appliances 14 and home utilities 16 in communication via the communication interface 12 may be applied by appliance controllers 42 for the party mode 84 as listed in the following steps (90-104):

Refrigeration Unit 30c/Icemaker 32c: Maximizing ice production, activating maximum cooling, activating appliance audio system (90);

Dishwasher 30d: De-activating cycle start delay, activating cycle start if dirty dishes detected (92);

Clothing Washer 30a: Delaying cycle start, entering quiet mode (94);

Clothing Dryer 30b: Delaying cycle start, entering quiet mode (96);

Oven 34a/Range 30e: Activating warming mode (98);

HVAC 16b: Adjusting temperature from a set point (e.g. decreasing the temperature set point); activating circulation fan (100);

Water Heater 16a: Activating max heating mode (102); and

Vent Hood 30g: Reducing fan speed; activating quiet mode (104).

Accordingly, the one or more appliance controllers 42 may be configured to control the appliances 14 and utilities 16 to support various appliance specific functions that relate to entertaining to enable the party mode 84.

Referring now to FIG. 4, a method 112 for activating a cooking mode 114 for global operation among the plurality of appliances 14 and utilities 16 is described. The method may begin by receiving an input on the mobile device 20 indicating an automatic or user selected cooking mode 114 (116). In response to receiving the input in step 116, the mobile device 20 may communicate the cooking mode 114 to the appliance controllers 42 (118). The appliance controllers 42 may receive the global setting indicating the cooking mode 114 via the communication interface 12.

In response to the instruction from the communication interface 12, the one or more appliance controllers 42 may activate the cooking mode 114 for the plurality of appliances 14 and home utilities 16. In order to apply the cooking mode 114 as a global setting to the plurality of appliances 14 and home utilities 16, the one or more appliance controllers 42 may control the individual appliances and utilities with appliance specific function controls. The appliance specific function controls for the appliances 14 and home utilities 16 in communication with the communication interface 12 may be applied by appliance controllers 42 for the cooking mode 114 as listed in the following steps (120-130):

Refrigeration Unit 30c/Icemaker 32c: Activating maximum cooling (120);

Dishwasher 30d: De-activating cycle start delay, activating cycle start if dirty dishes detected (122);

Oven 34a/Range 30e: Activating warming mode (124);

HVAC (additional home utility 16b): Cooling kitchen climate, adjusting temperature in response to number of active appliance (126);

Water pump (additional home utility 16b): Circulating hot water (128); and Vent Hood 30g: Activating fan to low setting (130).

Accordingly, the one or more appliance controllers 42 may be configured to control the appliances 14 and utilities 16 to support various appliance specific functions that relate to cooking and food preparation to enable the cooking mode 114.

Referring now to FIG. 5, a method 142 for activating a vacation mode 144 for global operation among the plurality of appliances 14 and utilities 16 is described. The method may begin by receiving an input indicating an automatic activation for user selection indicating the vacation mode 144 received on the mobile device 20 (146). In response to receiving the input in step 146, the mobile device 20 may communicate the vacation mode 144 to the appliance controllers 42 (148). The appliance controllers 42 may receive the vacation mode 144 via the communication interface 12.

In response to the instruction from the communication interface 12, the one or more appliance controllers 42 may activate the vacation mode 144 for the plurality of appliances 14 and home utilities 16. In order to apply the vacation mode 144 as a global setting to the plurality of appliances 14 and home utilities 16, the one or more appliance controllers 42 may control the individual appliances and utilities with appliance specific function controls. The appliance specific function controls for the appliances 14 and home utilities 16 in communication with the communication interface 12 may be applied by the appliance controllers 42 to enable the vacation mode 144 as listed in the following steps (150-162):

Refrigeration unit 30c/Icemaker 32c: Activating low energy usage mode, stopping ice production, activating door open notifications, activating usage notifications (150);

Dishwasher 30d: Periodically activating short cleaning cycle to prevent odors (152);

Clothing Washer 30a: Periodically activating short cleaning cycle to prevent odors (154);

Oven 34a/Range 30e: Blocking remote oven activation, blocking stove/cooktop activation (156);

HVAC (additional home utility 16b): Adjusting temperature to economy or eco settings (158);

Water heater 16a: Decreasing water temperature (160); and

Water pump 16b (additional home utility 16b): Deactivating water pump (162).

In this configuration, the appliances 14 and utilities 16 may operate to support the typical functions or limited operating levels that that relate to saving energy and promoting security during a period of vacation by applying appliance specific function controls.

In some embodiments, the vacation mode 144 may activate one or more security features initiated by the appliance controllers 42 of each of the appliances 14 and utilities 16. For example, each of the appliances may be equipped with a monitoring function activated in response to the vacation mode 144 or a variety of additional modes that may comprise a security or monitoring function as discussed herein (e.g. a senior mode, a kids/senior security mode, an away security mode, etc.). In response the activation of the vacation mode 144 or other security related functions discussed herein, the appliance controller 42 may be configured to monitor each of the appliances for a state change or activation that may be attributed to an intruder or unauthorized user. For example, in response to the activation of the vacation mode or a security away mode, the appliance controller 42 of each appliance 14 may be configured to monitor for one or more of the following events: a door access, an activation, a proximity detection, an on/off selection, a cycle start, a user input, or any other activation or detection that may be caused by an unexpected or unauthorized activation of the appliance 14 and/or the utilities 16.

In response to the detection of an event, the appliance controller 42 of the specific appliance triggered or identifying the event may output a notification. The notification may correspond to a communication, which may be transmitted from the appliance controller 42 via the transceiver circuit 40. The transceiver circuits 40 may communicate the notification to the one or more external servers 24 and/or the mobile device 20 via the communication interface. The notification may comprise information regarding the origin of the event (e.g. the appliance 14 and activity detected) and may be configured to activate an alarm or prompt on the mobile device 20 providing an alert of the notification. In this way, each of the appliance controllers 42 may be configured to detect a security event and communicate the notification to the mobile device 20 and/or the external server 24 to communicate the unexpected or unauthorized activation of the appliance 14 and/or the utilities 16.

In some embodiments, the activation of the vacation mode 144 or an away mode for a first home control system (e.g. the system 26) may cause the mobile device 20 to prompt or automatically activate a recovery mode or a full power mode for a second home control system. The second home control system may be similar to the system 26 but may be installed in a second residence or second location away from a first location of the first home control system. Accordingly, in response to the activation of the vacation mode for the first home control system, the mobile device 20 may be operable to identify a likely activation of the second home control system to the full power mode. The mobile device 20 may then prompt a user or automatically activate the full power mode for the second home control system in response to the activation of the vacation mode or away mode for the first home control system.

Each of the modes discussed herein may provide exemplary details describing appliance specific function controls that may be applied by the appliance controller 42 to the appliances 14 and utilities 16. In some embodiments, the modes may further include a shopping mode, which may similarly be applied via a selection on the mobile device 20 communicated through the communication interface 12. The shopping mode may be configured to instruct the appliance controller 42 to prepare the appliances 14 and utilities 16 for grocery unloading. For example, in response to receiving the shopping mode indication, the appliance controller(s) 42 may activate the refrigeration unit 30c to a maximum cooling mode and activate the water pump (additional home utility 16b) to circulate hot water.

An additional exemplary mode may include a cleaning mode. In response to receiving an instruction including the cleaning mode from the mobile device 20, the appliance controller 42 may activate the appliances 14 and utilities 16 to activate various cleaning functions. For example, the appliance controller 42 may apply the following appliance specific function controls to enable the cleaning mode as follows:

Refrigeration unit 30c and ice maker 32c: activating defrost cycle;

Dishwasher 30d: activating cycle start if dirty dishes are detected;

Range 30e and/or oven 34a: activating self-cleaning operation.

Accordingly, the appliance controller 42 may activate the appliance specific function controls for the appliances 14 and utilities 16 in response to receiving the instruction to activate the cleaning mode from the mobile device 20.

Another exemplary mode that may be activated by the appliance controller 42 in response to receiving an instruction from the mobile device 20 may include a chore mode. In response to receiving the instruction to activate the chore mode, the appliance controller 42 may activate the appliances 14 to report a time remaining on an active cycle. For example, each of the dishwasher 30d, the clothes washer 30a, the clothes dryer 30b, range 30e, the oven 34a, the cooktop 34b, a microwave (additional appliance 30g), and various additional appliances may be controlled by the appliance controller 42 to report a remaining time on an active cycle. The remaining time may be reported from the appliance controller 42 to the mobile device 20 via the communication interface 12. In this configuration, a user may identify the remaining time for various active cycles of the appliances 14 to efficiently plan the timing of completion of chores associated with the appliances 14.

Additional modes may also be activated by the appliance controller 42 in response to instructions from the mobile device 20. Such modes may include an eco-mode, a full power mode, a goodnight mode, a speed mode, a senior mode, a kids/senior security mode, an away security mode, and an emergency evacuation mode. The eco-mode may be configured to reduce energy use of the appliances 14 and utilities 16. Accordingly, the appliance controller 42 may be configured to constrain usage of the appliances corresponding to specific times of day to reduce energy use. In contrast, the appliance controller 42 may apply a full power mode by activating the appliances 14 and home utilities 16 to operate at maximum power in order to limit cooking time, cleaning time, etc.

In response to receiving a selection of a goodnight mode, the appliance controller 42 may run cycles for various appliances 14 such as the dishwasher 30*d*, the clothes washer 30*a*, the clothes dryer 30*b*, etc. such that the cycles are completed overnight. In response to the goodnight mode, the appliance controller 42 may further control the home utilities 16 to set the home control system 26 to an eco-mode reducing temperature and energy usage. In response to the speed mode, the appliance controller 42 may accelerate the operations of appliances 14. For example, the appliance controller 42 may increase a heating temperature of the range 30*e* or oven 34*a*, activate a maximum ice production for the ice maker 32*c*, limit cycle times for the clothes washer 30*a* and the clothes dryer 30*b*, etc.

In response to activation of the senior mode, the appliance controller 42 may track activity of the appliances 14 and output an indication after a predetermined period of use of one or more of the appliances 14. Additionally, the appliance controller 42 may restrict functions of various appliances 14 (e.g. the cooktop 34*b*, oven 34*a*, range 30*e*, etc.) in response to the senior mode. Similarly, such operations may be locked by the appliance controller 42 to prevent usage in response to the activation of a kids mode. As a final example, in response to an away security mode, the appliance controller 42 may log and report usage of any appliance in communication with the communication interface 12 to the mobile device 20. In this way, a home owner utilizing the home control system 26 may identify usage of the appliances 14 and utilities 16 to improve home security.

Figure 6:
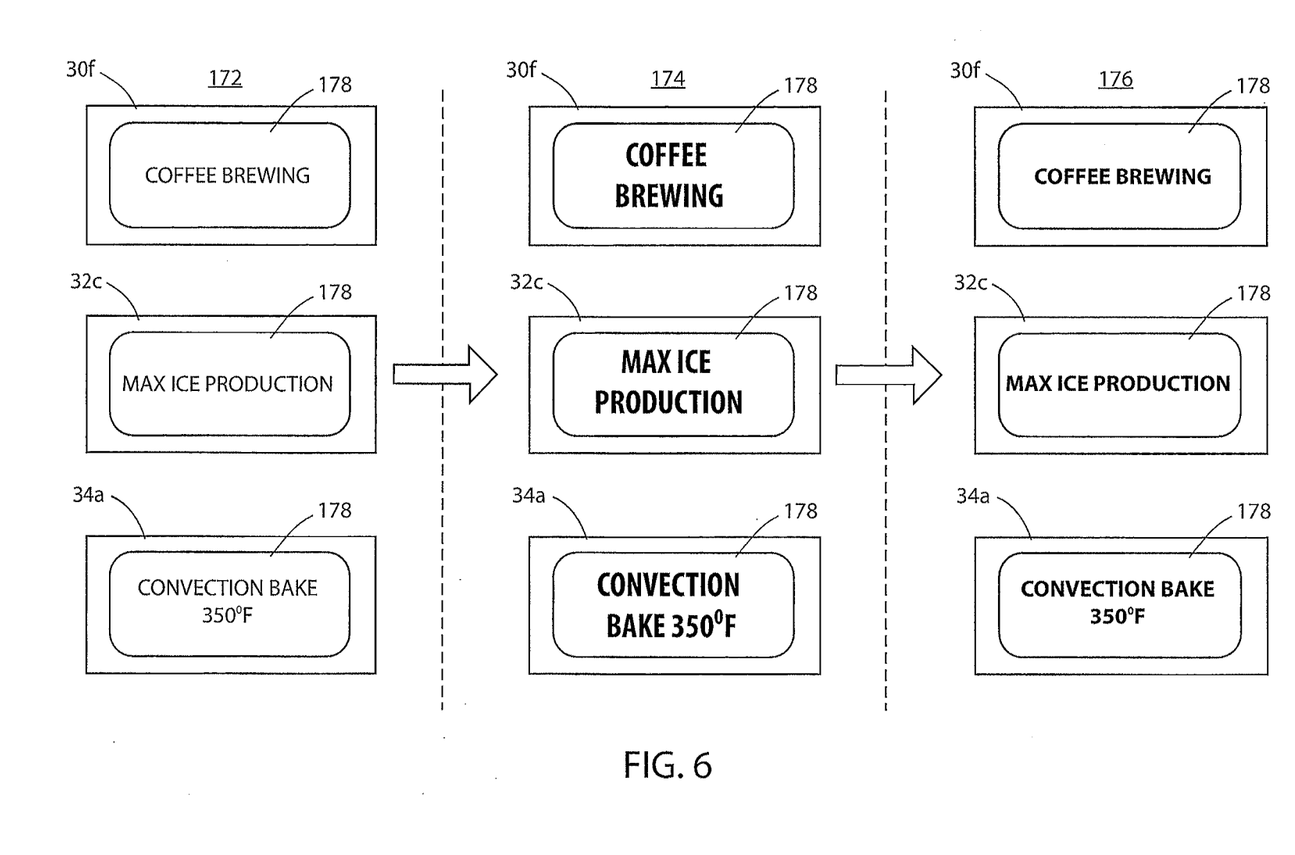
FIG. 6 is a block diagram demonstrating a plurality of themes globally applied among a plurality of appliances.

Referring now to FIG. 6, the one or more appliance controllers 42 may additionally apply one or more themes globally among the plurality of appliances 14 and home utilities 16. As demonstrated in FIG. 6, a first theme 172, a second theme 174, and a third theme 176 are shown on a plurality of displays 178 for each of the coffee maker 30*f*, the ice maker 32*c*, and the oven 34*a*. Though demonstrated in reference to the specific appliances shown in FIG. 6, the themes 172, 174, 176 may applied to displays 178 incorporated in any of the appliances 14 or utilities 16 as provided by the disclosure.

In order to activate the themes globally among the plurality of appliances 14 and utilities 16, an input may be received on the mobile device 20 identifying a selection of the first theme 172, the second theme 174, or the third theme 176. In response to the selection of the theme, the mobile device 20 may communicate a selected theme to the appliance controllers 42 via the communication interface 12. In response to receiving the selected theme, the appliance controllers 42 may globally apply the selected theme (e.g. 172, 174, or 176) to each of the appliances 14 and utilities 16. In this way, the home control system 26 may provide for global application of a theme on each of a plurality of appliances 14 and utilities 16.

As discussed herein, a theme may correspond to a font style, color, text proportions, volume selection, cycle or mode selection, or various other selections that may correspond to each of the themes 172, 174, or 176. For example, the first theme 172 may correspond to a default theme having standard text and color configurations. The second theme 174 may correspond to a high visibility theme having enlarged text and graphics optimized for visibility. The third theme 176 may correspond to a stylized theme having ornamental text and various other properties that may be considered visibly appealing. Accordingly, the home control system 26 may provide for a user selection on the mobile device 20 which may provide for a theme to be applied to configure the appearance of a plurality of displays among each of a plurality of appliances 14 and home utilities 16.

Figure 7:
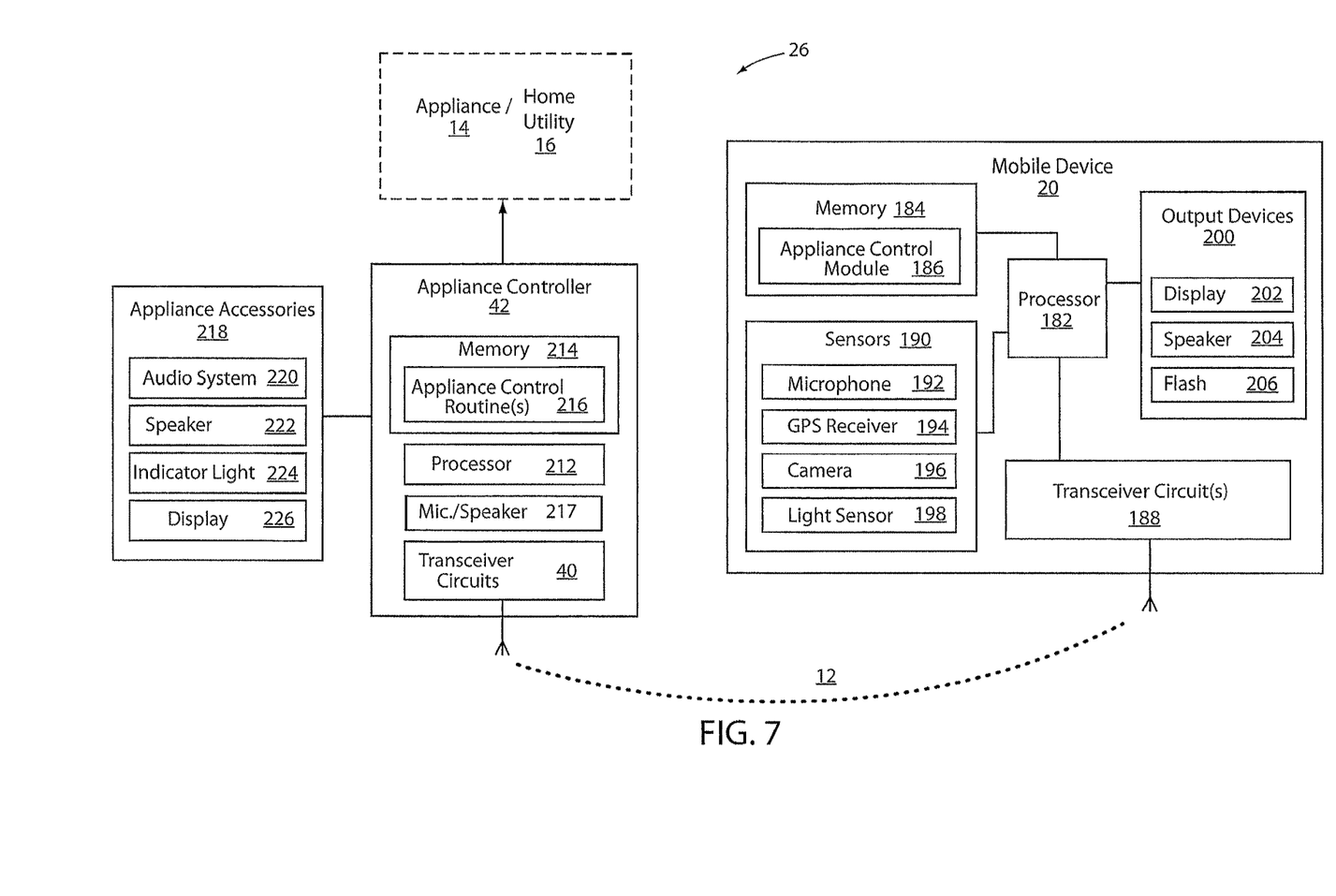
FIG. 7 is a block diagram demonstrating a mobile device in an appliance controller in communication in accordance with the disclosure.

Referring now to FIG. 7, a block diagram of the mobile device 20 and an exemplary appliance controller 42 is shown. The mobile device 20 may correspond to various forms of mobile devices, including but not limited to a smart phone, tablet, cellular telephone, laptop, etc. The mobile device 20 may comprise a processor 182 in communication with a memory 184. The processor 182 may correspond to one or more microprocessors and/or control circuits configured to process instructions that may be stored in the memory 184. In an exemplary embodiment, the processor 182 may be configured to access and process instructions incorporated in an appliance control module 186, which may be stored in the memory 184. In this way, the processor 182 may be configured to processor various computational tasks that may be associated with selecting and communicating the various modes and themes discussed herein. Though described as a processor, the processor 182 may correspond to various forms of application specific integrated circuits (ASICS), digital-signal-processors (DSPS), a group of processing components, and/or other suitable electronic processing components. The memory 184 may correspond to one or more devices (e.g. RAM, ROM, flash memory, hard disk storage, etc.) for storing data and/or computer code that may be utilized to facilitate the various processes described herein.

The mobile device 20 may further comprise one more transceiver circuits 188. The transceiver circuits 188 may be configured to communicate with the communication interface 12 and/or in some embodiments directly with a transceiver circuit 40 of one or more of the appliances 14. Such communication between the transceiver circuits 40 and 188 and/or the transceiver circuit 188 with the communication interface 12 may be supported by a variety of communication protocols. Examples of such communication protocols may include an IEEE 802.11 connection, and IEEE 802.15 connection, a Bluetooth® connection, a Wi-Fi connection, a WiMAX connection, and various types wireless signal communication protocols.

In some embodiments, the mobile device 20 may further include a plurality of sensors 190. The sensors 190 may be controlled by the processor 182 and provide various inputs that may be utilized to trigger automatic events to activate or control the home control system 26. The sensors 190 may comprise one or more of a microphone 192, a GPS receiver 194, a camera 196, a light sensor 198, and various other sensors that may be utilized with a mobile device 20. Accordingly, the mobile device 20 may be utilized to trigger a selection of a mode and/or a theme based on a variety of inputs that may be received from one or more of the sensors 190.

The mobile device 20 may further include a plurality of output devices 200. The output devices may comprise a display 202, a speaker 204, a flash 206, and additional output devices that may be utilized with mobile devices. The display 202 may correspond to various forms of displays, including but not limited to a liquid crystal display (LCD), an e-ink display, a plasma display, a light emitting diode (LED) display, or other display devices. The speaker 204 may correspond to various forms of speakers that may be utilized to output voice, music, or audible alerts. The flash 206 may be associated with the camera 196 *a* may be an LED or other light source.

In some embodiments, the mobile device 20 may be configured to receive voice commands via the microphone 192. The voice commands may comprise one or more instructions configured to identify a selected mode of a plurality of modes to control a global setting of the plurality of the appliances and/or home utilities discussed herein. In such embodiments, the processor 182 of the mobile device 20 may be configured to receive the voice command as an audio signal from the microphone 192. The processor 182 may then perform a voice recognition, transformation and/or translation to identify a control message indicated in the voice command. In such embodiments, the processor 182 may comprises one or more processing modules configured to analyze voice data and convert the voice data into syntax. Additionally, the processor 182 may comprise parsing logic for determining command information to identify the control message from the syntax.

In response to the voice command, the mobile device 20 may send the control message or signal to the appliance controllers 42 via the communication interface 12 to control the selected mode for the appliance controllers 42. In some embodiments, the mobile device may additionally or alternatively be configured to record the voice command and communicate the voice command to a cloud based processor or server via the transceiver circuit 188 to perform the voice recognition. Accordingly, the mobile device 20 may provide for a voice controlled functionality to control the global setting of the plurality of appliances and/or home utilities as discussed herein.

In some embodiments, the mobile device 20 may correspond to a voice control apparatus or virtual assistant. The voice control apparatus may comprise one or more of the processor 182, memory 184, transceiver circuit 188, microphone 192, speaker 204, and additional components as discussed herein. The voice control apparatus may be configured to monitor a room or space in a home for one or more voice commands. The processor 182 may receive one or more voice commands and communicate them to the remote server 24 (e.g. a cloud server) for voice recognition as previously discussed. The remote server 24 may then return a control message to the processor 182 identified from the voice command. The processor 182 may apply the control message to control a global setting of the home control system 26. Accordingly, the voice control apparatus may be utilized alone or in combination with other mobile devices 20 to provide control instructions to the home control system 26. In this configuration, the home control system 26 may provide for convenient accessibility to control the global setting of the plurality of appliances and/or home utilities as discussed herein.

The appliance controller 42 may comprise a processor 212 and a memory 214. The processor 212 may correspond to one or more microprocessors or circuits configured to control operations that may be specific to each of the appliances 14 or utilities 16 as discussed herein. The memory 214 may be configured to store various processing steps and may comprise an appliance control routine 216. The appliance control routine 216 may comprise various steps associated with each of the modes and/or themes discussed herein. Accordingly, the appliance controller 42 may be configured to control each of the appliances 14 and utilities 16 to apply various appliance specific function controls based on the appliance control routine 216 and corresponding modes stored in the memory 214.

In some embodiments, the appliance controller 42 may further comprise a microphone and speaker 217 (e.g. Mic\Speaker 217). The microphone and speaker 217 may be in communication with the processor 212 and the memory 214. In this configuration, the appliance controller 42 may be configured to control the operation of the home control system 28 in response to one or more voice commands. Similar to the voice commands discussed in reference to the mobile device 20, the appliance controller 42 may similarly receive and recognize one or more voice commands or instructions. The voice commands may be configured to identify a selected mode to control a global setting of the plurality of the appliances and/or home utilities.

For example, in response to the voice command, "Control home to cooking mode," the appliance controller 42 may recognize the selection of the cooking mode 114. The appliance controller may then communicate the mode setting to each of the appliance controllers 42 via the communication interface 12. In this way, the appliance controller 42 may utilize the voice command to set the home control system 26 to the cooking mode 114. Accordingly, the appliance controller 42 may provide for hands free operation of the home control system 26 when an operator is within a recording or monitoring range of the microphone and speaker 217.

In some embodiments, each appliance controller 42 of the home control system 26 may be configured to communicate a feedback notification to the mobile device 20. For example, each of the appliance controllers 42 may be operable to communicate a status update to the mobile device 20 and/or the remote server 24. The status update may comprise a notification of a present state of the appliance 14 and may be output in response to a selection of a mode and/or a theme. The notification may correspond to a communication, which may be transmitted from the appliance controller 42 via the transceiver circuit 40. The transceiver circuit 40 may communicate the notification to the one or more external servers 24 and/or the mobile device 20 via the communication interface 12. The notification may comprise status information regarding one or more of the appliances 14 connected home control system 26. Accordingly, based on the notification from the appliance controller 42, the mobile device 20 may update a status indication of a current process of each of the appliances 14 based on the mode selection or the global setting of the plurality of appliances 14 and home utilities 16.

The memory 214 may correspond to various forms of memory devices (e.g. RAM, ROM, flash memory, hard disk storage, etc. for storing data and/or computer code for facilitating the various processes described herein. The appliance controller 42 may further be in communication with various appliance accessories 218. The appliance accessories 218 may comprise an audio system 220, a speaker 222, an indicator light 224, and/or a display 226. Accordingly, the appliance controller 42 may control the appliance accessories 218 in response to receiving an instruction via the communication interface 12 including a selection of a mode and/or theme in accordance with the disclosure.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A system for controlling a plurality of appliances:
   the plurality of appliances in communication via a communication interface, the appliances comprising a plurality of controllers in communication with a mobile device, wherein each of the plurality of controllers is configured to:
     receive an instruction from the mobile device corresponding to a selected mode of a plurality of modes;
     apply the selected mode among the plurality of appliances as a selected global setting of a plurality of available global settings;
     activate an appliance specific control routine for each of the plurality of appliances based on the selected global setting; and
     control each appliance based on the appliance specific control routine, wherein the appliance specific control routine comprises a plurality of controls configured to control an operation of each of the plurality of appliances causing the operation to conform to the selected mode, wherein the selected mode is a quiet mode, and in response to the quiet mode,
   a first controller of the plurality of controllers is configured to control a clothes washer and wherein the appliance specific control routine for the quiet mode for the clothes washer comprises reducing a spin speed of the clothes washer and delaying a cycle start of a wash cycle, and
   a second controller of the plurality of controllers is configured to control a refrigeration unit and wherein the appliance specific control routine for the quiet mode for the refrigeration unit comprises silencing audible alerts, disabling a defrost mode, and suspending ice making.

2. The system according to claim 1, wherein the mobile device is configured to control an application comprising the plurality of modes and identify the selected mode in response to a user input to the mobile device.

3. The system according to claim 1, wherein the communication interface corresponds to a wireless communication network provided by a router configured to provide for wireless communication among the plurality of appliances and the mobile device.

4. The system according to claim 1, wherein a third controller of the plurality of controllers is configured to control a dishwasher to apply the appliance specific control routine comprising decreasing the water pressure for operation.

5. A method for controlling a plurality of appliances to apply a global setting for operation:
   receiving an instruction from a mobile device corresponding to a selected mode of a plurality of modes;
   applying the selected mode among the plurality of appliances as a selected global setting of a plurality of available global settings;
   activating an appliance specific control routine for each of the plurality of appliances based on the selected global setting;
   controlling each appliance based on the appliance specific control routine, wherein the appliance specific control routine comprises a plurality of controls configured to control an operation of each of the plurality of appliances causing the operation to conform to the selected mode, wherein the selected mode is a party mode;
   in response to the party mode, deactivating a cycle start delay and activating an appliance of the plurality of appliances to initiate a processing cycle and controlling a refrigeration unit to maximize ice production and activate a maximum cooling setting.

6. The method according to claim 5, further comprising:
   displaying the plurality of modes on a display of the mobile device; and
   receiving a selection on the mobile device indicating the selected mode.

7. The method according to claim 5, further comprising:
   in response to the party mode, activating a warming mode of an oven.

8. The method according to claim 5, further comprising:
   in response to the party mode, adjusting a set temperature and activating a circulation fan of an HVAC system.

9. The method according to claim 5, further comprising:
   in response to the party mode, delaying a cycle start of a clothes washer and a clothes dryer.

10. A system for controlling a plurality of appliances:
    a plurality of appliances in communication via a communication interface, the plurality of appliances comprising a plurality of controllers in communication with a mobile device, wherein each of the plurality of controllers is configured to:
      receive an instruction from the mobile device corresponding to a selected mode of a plurality of modes;
      apply the selected mode among the plurality of appliances as a selected global setting of a plurality of available global settings;

activate an appliance specific control routine for each of the plurality of appliances based on the selected global setting; and control each appliance based on the appliance specific control routine, wherein the selected mode comprises an away mode configured to control an operation of each of the plurality of appliances causing the operation to conform to the away mode, and in response to the away mode, the controller is configured to monitor each of the plurality of appliances and identify a manual activation of one of the plurality of appliances, and in response to the manual activation identified in the away mode, communicate the manual activation to the mobile device.

11. The system according to claim 10, wherein, in response to the away mode, the plurality of controllers are configured to activate a low energy mode for the plurality of appliances.

12. The system according to claim 10, wherein a first controller of the plurality of controllers is configured to control at least one of an oven, a cooktop, and a range to block a heating activation based on the away mode.

* * * * *